Jan. 26, 1960
F. J. KRIZ
2,922,217
FILING MACHINE
Filed Jan. 30, 1956
2 Sheets-Sheet 1
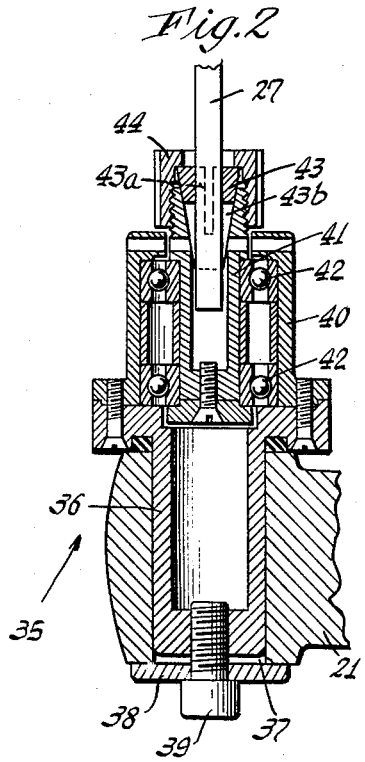
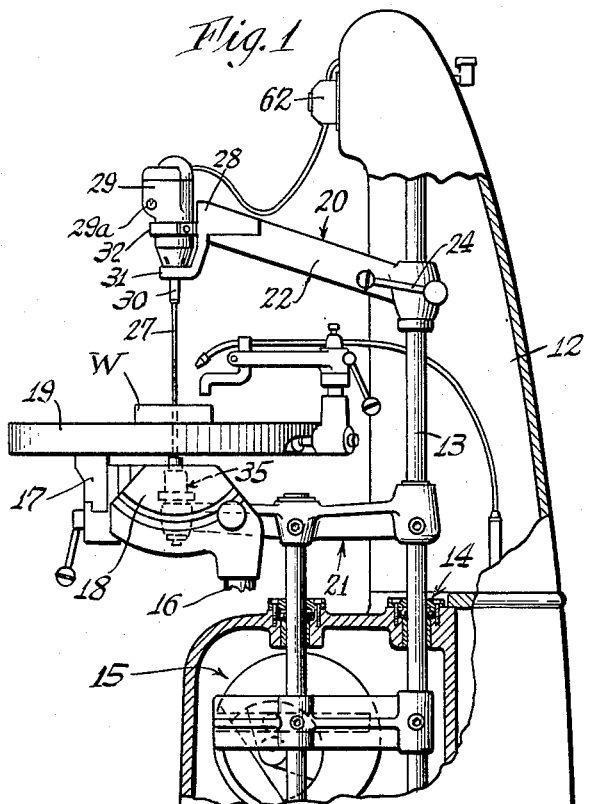
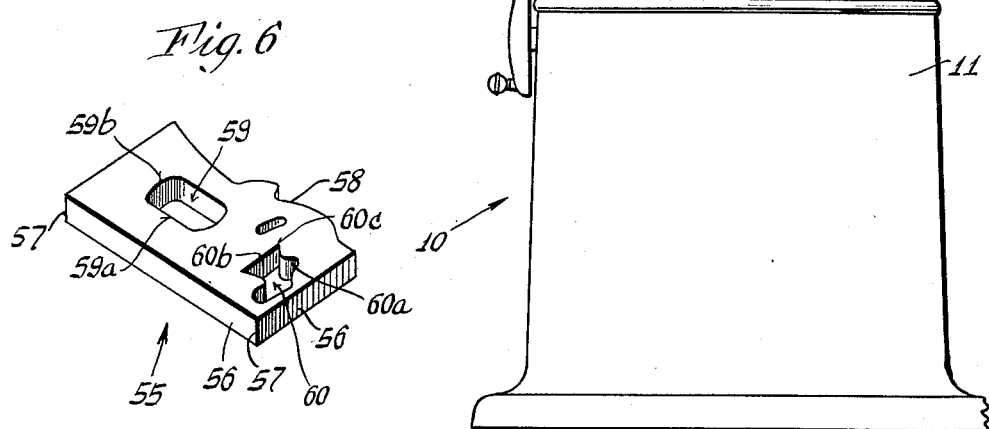
INVENTOR.
Ferdinand J. Kriz
BY
Johnson and Kline
ATTORNEYS Jan. 26, 1960
F. J. KRIZ
2,922,217
FILING MACHINE
Filed Jan. 30, 1956
2 Sheets-Sheet 2
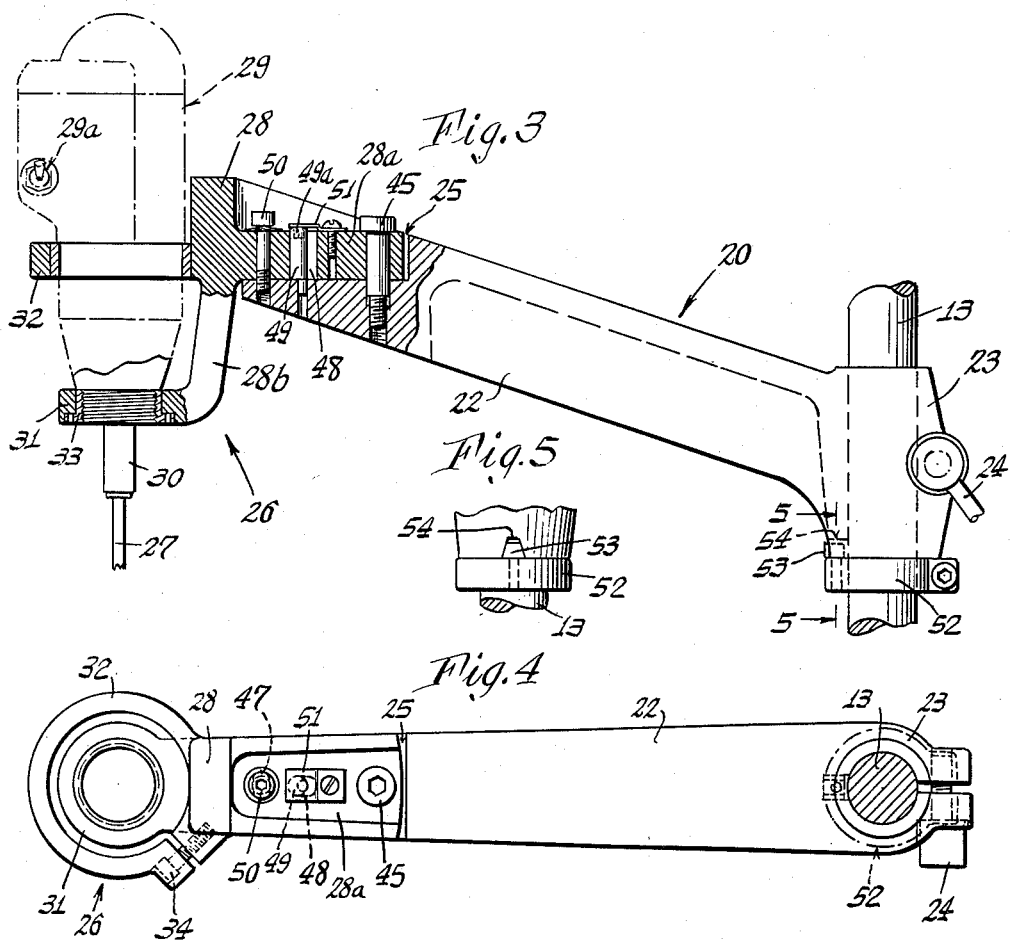
INVENTOR.
Ferdinand J. Kriz
BY
Johnson and Kline
ATTORNEYS United States Patent Office 2,922,217
Patented Jan. 26, 1960

2,922,217

FILING MACHINE

Ferdinand J. Kriz, Fairfield, Conn., assignor to Connecticut Tool and Engineering Company, Bridgeport, Conn., a corporation of Connecticut Application January 30, 1956, Serial No. 562,078

1 Claim. (Cl. 29—76)

This invention relates to a combination filing, sawing, grinding and honing machine or the like, and more specifically to the said machine as utilized for filing and honing relatively intricate machine parts wherein the working tool is maintained in tension as it simultaneously rotates and reciprocates in a predeterminate manner to perform the desired machining operation.

Heretofore, in machining various machine parts, a filing or honing operation was performed either with a reciprocating tool or by a rotating and reciprocating tool conventionally supported at one end only in a rotating chuck.

In manufacturing dies and/or machine parts, it is frequently necessary to machine the same within very close tolerances. Oftentimes, these parts require also relatively intricate closed inner and outer contours to be formed wherein it is frequently necessary that the straight surfaces thereof be blended into the radius of a curved surface. In those machines performing a filing operation or the like having simply a reciprocating tool, it was difficult, if not impossible, to blend the straight surfaces of a particular workpiece with the curved surfaces thereof when such was desired. While a machine employing a rotating and reciprocating tool conventionally supported at one end only in a rotating chuck could perform such a blending of the straight and curved surfaces of a workpiece, the desired accuracy in machining the same with such a tool was greatly impaired, the inaccuracies resulting because of the tendency of the free end of the rotating tool to whip or vibrate out of alignment when rotated, thereby rendering the operation difficult to control. This condition was further aggravated when the reciprocating stroke and/or r.p.m. of the tool was increased.

It is an object of this invention to overcome the above disadvantages by providing means whereby the advantages of filing or honing with a reciprocating and rotating tool can be utilized, while at the same time increasing the accuracy, efficiency and economy with which a workpiece can be finished with such a tool.

It is another object of the present invention to provide for supporting a working tool in tension between a pair of rotating chuck means which are reciprocally mounted whereby the tool can rotate and reciprocate simultaneously so that the end portions thereof are prevented from vibrating out of alignment during the machining operation.

Another object of this invention is to provide means whereby, if for any reason, the tool is removed from the workpiece, such as for inspection of the piece or the like, before the completion of the specific machining operation, the parts, i.e. the tool and workpiece can be properly repositioned in proper relationship to each other automatically and accurately with a minimum of lost set-up time so that the operation can be continued from the point of interruption.

According to this invention, the improvement consists of a machine wherein the working tool has the end portions thereof supported by a pair of oppositely disposed, substantially aligned, rotating chucks which are arranged to reciprocate as a unit; one of the chuck means having means whereby the tension exerted on the tool can be readily adjusted. A variable speed drive means is provided to rotate the chucks and tool independently of the reciprocating means so that the tool can either rotate, reciprocate or do both simultaneously. By supporting both ends of the tool and maintaining the same in tension, it is discovered that greater accuracy is afforded since whipping or vibrating the tool out of alignment is eliminated. More specifically, the present invention provides a novel means for mounting a variable speed motor on the reciprocating arm for rotating the tool. In order that the chucks may be substantially aligned to properly support the tool in tension therebetween, means are provided whereby the chucks are rendered laterally adjustable relative to each other. Means are further provided whereby the tool may be realigned relative to the workpiece if for any reason, the operation has been interrupted and the workpiece removed for inspection or the like.

A feature of this invention resides in the improved filing and honing machine which is relatively simple in construction, inexpensive to manufacture and positive in operation.

Another feature of this invention resides in the novel means whereby the parts may be realigned so that an intermittent machining operation can be performed with the minimum of lost time in relocating parts relative to each other in order to continue the interrupted machining operation.

Another feature of this invention resides in the relative simplicity in which the amount of tensioning acting on the tool can be varied.

Other features and advantages will be apparent from the specification and claim when considered with the drawings in which:

Figure 1 is a side elevational view partly shown in section of the improved filing and honing machine of this invention.

Fig. 2 is a detail sectional view of the rotating chuck means which supports the tool in tension.

Fig. 3 is an enlarged detail side view of the upper arm supporting the rotating motor assembly including the means whereby the motor assembly is rendered relatively adjustable with respect to the said arm and lower chuck assembly.

Fig. 4 is a detail plan view of the arm illustrated in Fig. 3.

Fig. 5 is a detail side view taken in the direction of the arrows 5—5 of Fig. 3 illustrating the means by which the relative parts can be repositioned to facilitate the continuance of a machining operation which is interrupted for any reason.

Fig. 6 is a detail perspective view of a workpiece illustrating various curves which can be accurately and economically formed on the machine of the present invention.

Referring to the drawings, Fig. 1 illustrates a combination filing, sawing, grinding and honing machine or the like comprising a frame 10 consisting of a base or pedestal 11 having an upwardly extending column or post portion 12 mounted on the rear thereof. Reciprocally supported in the frame 10 is a guide rod 13 journaled in upper and lower bearings (not shown) and intermediate bearing 14. Power operated means 15, preferably as described in Williams Patent No. 2,815,681 issued December 10, 1957, are provided to reciprocate the guide rod 13 in a predeterminate manner, i.e. said power means including means for controlling the length and rate of the stroke to more effectively carry out the desired machining operation. Adjacent the front portion of the frame 10 and extending upwardly from the pedestal is an adjustable post 16 (fragmentarily shown) cooperating in conjunction with a pair of sectors 17 and 18 to carry a table 19 for supporting thereon a workpiece W, said table being capable of tilting in any direction.

According to this invention, when the machine is adapted to perform a filing or honing operation, an improved and novel tool holding means is provided whereby the working tool is rotatably mounted in tension so that, if desired, the tool can be simultaneously rotated and reciprocated. Rotating and reciprocating a tool and maintaining it under tension, it has been discovered, provides for more accuracy in a machining operation. This is rendered possible, despite the fact that the tool is of such a character that it is not capable of being self-supporting because the outer ends of the tool are confined and the intermediate portion thereof held taut by tension applied thereto, thereby maintaining the tool accurately aligned against the surface of the workpiece to be machined regardless of the rate of rotation and/or reciprocation of the tool.

As illustrated, this is accomplished by supporting the tool between a pair of rotating chuck assemblies spacially supported by arms 20 and 21 which are connected to the guide rod, one of the arms 20 being disposed above the table and the other arm 21 being disposed below the table 19.

According to this invention, the upper arm 20 consists of an elongate member 22 having a split collar 23 on one end thereof for slidably connecting the said arm to the guide rod 13. Thus, the arm 20 can be readily positioned along any predeterminate part of the rod by sliding the same relative to the guide rod. In order that the arm 20 can be firmly secured to the rod 13 to prevent relative movement therebetween as the latter reciprocates, a quick-release clamping lever 24 is provided to clamp and unclamp the collar portion about the rod. Thus, it will be noted that when the arm 20 is clamped to the rod 13, the same will be rendered immovable relative thereto and reciprocable therewith.

On the other end of the arm 20 there is provided a recess or cut-out portion 25 providing a seat in which various types of tooling can be removably secured thereto. According to this invention, the particular tooling illustrated consists of a motor assembly 26 for supporting and rotating a tool 27, e.g. a rat-tail file or the like.

The motor assembly 26 as shown in Figs. 1, 3 and 4 includes a bracket 28 having secured thereto a motor means 29 provided with a chuck 30 for supporting the working tool 27. As shown, the bracket 28 is provided with a mounting portion 28a adapted to seat in the recess 25 and a depending flange 28b having extending substantially perpendicular thereto a pair of spaced parallel motor supports 31 and 32.

As shown, the supports 31 and 32 consist of a pair of annular members adapted to be fitted about the body portion of the motor. If desired, the lower support 31 is provided with an internal threaded bushing 33 which is threaded to one end of the motor casing. The other support 32 is positioned about an intermediate portion of the motor and firmly secures the same thereto, the motor being provided with a chuck for receiving one end of the tool. In order that various size motors can be supported on the bracket 28, the upper annular member 32 is split to render the latter adjustable. Simply by adjusting the screw 34, the diameter of the annulus can be varied to accommodate motor means of various sizes.

As shown in Fig. 1, the tool 27 secured to the upper chuck 30 extends downwardly through an aperture in the table and is anchored at its other end in a second rotating chuck assembly 35 carried by the lower arm 21, which arm is fixed to the guide rod 13.

According to this invention, the lower chuck assembly 35 includes a holder 36 which is slidably mounted in an aperture 37 on the outer end of the arm 21 and is secured thereto by means of a washer 38 and adjusting screw 39. The holder 36 has connected thereto a housing 40 in which an arbor 41 is rotatably supported by means of a pair of spaced bearing members 42. In order that the lower end of the tool or file 27 may be secured to the assembly in tension, taper collet 43 having opposed upper and lower slits 43a and 43b respectively is positioned in the upper portion of the arbor 41, the collet 43 receiving the lower end of the tool. To secure or clamp the tool therein a tightening nut 44 is provided, the nut 44 causing the collet 43 to clamp the tool as the nut forces the collar into the arbor. By securing the tool 27 at both ends, the tool becomes securely anchored and lateral displacement of the end portions thereof during rotation and/or reciprocation is eliminated, thereby insuring greater accuracy. In order that the amount of tension of the tool can be varied, the adjusting screw 39 can rotate in either direction accordingly, to raise or lower the chuck assembly 35 relative to the arm 21; thus, when the chuck assembly 35 is moved downwardly as viewed in Fig. 2, the tool tends to become taut in tension.

As illustrated in Fig. 1, it will be noted that the upper and lower chuck assemblies are arranged so as to be rendered in substantial alignment with each other. However, if for any reason they become misaligned or if the nature of the operation requires that the cutting tool be slightly positioned out of alignment, means are provided whereby the chuck assemblies may be laterally adjusted relative to each other.

According to this invention, this is accomplished by pivotally mounting the motor bracket 28 to the upper arm 20. As illustrated in Figs. 3 and 4, a pin 45 extending through aperture 46 of the bracket forms a pivot about which the bracket is pivoted. The bracket 28 is further provided with a transversely extending slot 47 and longitudinally extending slotted opening 48. As illustrated in Fig. 4, the longitudinally extending slot 48 is positioned intermediate the transverse slot 47 and a pivot pin 45. Positioned in the longitudinally extending slot 48 is an eccentric pin 49 provided with an Allen head 49a in which an Allen wrench can be inserted to rotate the eccentric pin, so that the eccentric portion of the pin engages the peripheral portions of the slot causing the bracket to be pivoted about the pin 45. Therefore, as the eccentric pin 49 is rotated either upwardly or downwardly as viewed in Fig. 4, the motor and chuck assembly supported by the bracket is laterally moved accordingly. In order that the bracket 28 may be secured in the adjusted position, a locking screw 50 is carried in the transverse slot 47; thus, the bracket 28 can be securely locked in adjusted position by tightening the locking screw. If desired, a cover 51 pivotally mounted is provided to protect the longitudinal aperture 48 against the lodging of foreign particles therein. The cover 51 also is a means of retaining eccentric pin 49 in position when high reciprocating speeds are used. Adjustment of the motor bracket enables the tool to be vertically aligned between the chucks. Further, the adjustment enables an intentional misalignment to be made if the desired operation requires the surface of a piece to be machined slightly off the perpendicular, e.g. finishing an aperture with slightly tapered walls.

In machining various machine parts and dies requiring the machining of relatively intricate and complex surfaces, it is frequently necessary for the machining operation to be interrupted for inspection and/or for comparing the workpiece W with a template. In order to facilitate repositioning of the tool 27 relative to the workpiece W to continue the machining operation so as to eliminate as much loss of time as possible upon completion of the inspection or the like, means are provided whereby the tool may be automatically and accurately repositioned relative to the workpiece. This is accomplished by a stop collar 52 predeterminately fixed to the guide rod 13 so that in the initial starting position the collar 52 forms a stop for the upper arm 20 as shown in Fig. 1. Cooperating male and female components are provided on the stop collar and the arm to laterally position the stop collar and arm relative to each other. As shown in Fig. 5, the stop collar 52 is provided with a tapered projection or pin 53 which is adapted to be snugly received in a recess 54 formed in the collar portion 23 of the arm 20. Thus, when the pin 53 is positioned in the recess 54, the parts are considered to be properly aligned.

In order to remove the workpiece W from the tool when machining an internal closed contour or an aperture therein, it is necessary to remove the lower end of the tool from the lower chuck assembly by loosening the collet. The clamping lever 24 of the upper arm member 20 is then rotated counterclockwise as viewed in Fig. 1 to render the arm slidable relative to the rod 13. The arm 20 is then moved upwardly to free the tool 27 from the workpiece W, thereby permitting the workpiece to be removed from the machine to be inspected or the like. It will be noted that in doing so, the arm is moved away from the stop collar 52 and is free to rotate about the rod, thus disturbing the alignment of the chucks.

Therefore, when the workpiece is returned to the machine, the parts are automatically aligned by simply sliding the arm 20 down to the collar 52 which forms a limit therefor, and rotating the arm until the recess 54 of the arm receives the projection 53 of the collar. Thus, when the recess 54 and pin 53 are mated, the alignment of the chucks is assured.

Since the motor means 29 are rendered operable independently of the power means 15 for reciprocating the guide rod, it will be noted that the tool 27 can be separately rotated or reciprocated, or the tool can be simultaneously rotated and reciprocated. As a result, the apparatus herein described is capable of performing filing operations requiring reciprocation or rotation of the tool only, or a filing operation requiring both.

Fig. 6 illustrates a workpiece depicting various types of contours or surfaces which can be finished by the apparatus herein described. As shown, the block 55 has an outer contour consisting of straight edge portions 56 having sharp corners 57, and an edge 58 having a relatively intricate and complex outer contour. According to this invention, the straight edges and sharp corners can be formed in the conventional manner of simply reciprocating the tool, the motor circuit remaining de-energized. The complex edge can be machined by rotating and reciprocating the tool simultaneously, if desired, by simply energizing the motor means by closing switch 29a, causing the tool to rotate as it reciprocates.

The apparatus described is equally suited to machine inner contours illustrated by apertures 59 and 60. Aperture 59 is shown as oval shaped in which the straight edges 59a are blended into the radii portions 59b thereof. The apparatus described is particularly useful in performing this blending operation more accurately than was heretofore possible, the blending being accomplished by rotating the tool as it reciprocates. Reciprocating the tool only cannot accomplish such blending, nor can the same be as accurately performed by rotating and reciprocating a tool supported at one end only as heretofore practiced, because of the vibration at the free end of the tool.

Aperture 60 is an example of a closed contoured surface having a complex portion 60a and a straight edge portion 60b joining the former to form a sharp corner 60c. This contour is relatively easily formed by the combination of reciprocating the tool on the straight edge to form the sharp corners, and rotating and reciprocating the tool on the complex edge portion.

Thus, it will be noted that the apparatus herein described can perform a variety of operations in a single set-up position, which heretofore required a plurality of set-ups and/or tool changes. Consequently, the apparatus of the present invention greatly reduces the amount of set-up time required to machine a relatively complex or compound surface, especially during an interrupted operation, while at the same time increasing the accuracy and efficiency with which the operation can be performed.

If desired, a variable speed means 62 may be included in the motor circuit so that the r.p.m. of the tool may be varied according to the requirements of a specific machining operation. Thus, the apparatus described is provided with means for varying the length of the reciprocating stroke, rate of the stroke, and also r.p.m. of the tool, so that the desired conditions can be established to most effectively perform the machining operation depending on the size, shape and kind of material being worked upon.

Variations and modifications may be made within the scope of the claim and portions of the improvements may be used without others.

I claim:

A filing machine or the like comprising a frame having a compound tilting table provided with an aperture; a reciprocating guide rod mounted on said frame; means for reciprocating said rod; tool holding means connected to said rod to reciprocate therewith, said tool holding means including an upper and lower arm member connected to said rod disposed above and below said table respectively, said upper arm being slidably mounted on said rod, said slidably mounted arm having a clamping means for locking said arm to said rod; a variable speed motor assembly having a rotating chuck adjustably carried by said slidable arm and having means for manually varying the speed of said motor; a rotating chuck assembly mounted on said lower arm; a tool adapted to extend through said aperture of said table and having the end portions thereof secured in said chucks, said tool being of such a character that it is not capable of being self-supporting and its intermediate portion being held taut by tension applied thereto by said rotating chuck assembly, said assembly including means for adjusting the tension of said tool, said motor assembly continuously rotating said tool when energized so that in operation said tool can rotate as it reciprocates to perform a more accurate and economical machining operation; and an adjustable locating stop means fixed in predeterminate position on said rod to limit the movement of said upper arm, said upper arm and stop means having cooperating male and female components to insure proper realignment of the tool and workpiece in an intermittent machining operation.

References Cited in the file of this patent

UNITED STATES PATENTS

| | | |
|---|---|---|
| 674,244 | McGeorge | May 14, 1901 |
| 824,948 | Pollock | July 3, 1906 |
| 1,395,381 | Biddle | Nov. 1, 1921 |
| 1,470,143 | Buterbaugh | Oct. 9, 1923 |
| 1,636,729 | Yarrington | July 26, 1927 |
| 1,660,887 | Romanoff | Feb. 20, 1928 |
| 1,723,389 | Thiel | Aug. 6, 1929 |
| 1,887,437 | Schotthoefer | Nov. 8, 1932 |
| 2,201,032 | Everett | May 14, 1940 |
| 2,244,813 | Tommerup | June 10, 1941 |
| 2,368,982 | Guze | Feb. 6, 1945 |
| 2,372,088 | Kaveny | Mar. 20, 1945 |
| 2,613,701 | Nathan | Oct. 14, 1952 |
| 2,657,933 | Stuebner | Nov. 3, 1953 |
| 2,670,018 | Coates | Feb. 23, 1954 |
| 2,792,033 | Bradley | May 14, 1957 |
| 2,823,446 | Crane | Feb. 18, 1958 |

FOREIGN PATENTS

| | | |
|---|---|---|
| 263,169 | Germany | Oct. 22, 1911 |
| 264,127 | Great Britain | May 12, 1927 |